(12) United States Patent
McNeill et al.

(10) Patent No.: US 11,391,807 B2
(45) Date of Patent: Jul. 19, 2022

(54) SYSTEMS AND METHODS FOR USE IN TRANSMITTING DATA

(71) Applicant: Honda Motor Co., Ltd., Tokyo (JP)

(72) Inventors: David J. McNeill, Delaware, OH (US); Robert Mark Ziccardi, Marysville, OH (US); Ryan Thomas Sonoda, Marysville, OH (US); Dylan Hickman, Dublin, OH (US); Brian D. Ayers, Hilliard, OH (US); Mark Blustein, Saitama-ken (JP); Derrick Ian Cobb, Delaware, OH (US); Andrew Kent Hittle, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 438 days.

(21) Appl. No.: 16/752,807

(22) Filed: Jan. 27, 2020

(65) Prior Publication Data
US 2021/0231764 A1    Jul. 29, 2021

(51) Int. Cl.
| | | |
|---|---|---|
| *H04B 17/318* | (2015.01) | |
| *G01S 1/68* | (2006.01) | |
| *H04W 4/029* | (2018.01) | |
| *H04W 4/02* | (2018.01) | |
| *G07C 5/08* | (2006.01) | |

(52) U.S. Cl.
CPC .............. *G01S 1/68* (2013.01); *G07C 5/0808* (2013.01); *H04B 17/318* (2015.01); *H04W 4/023* (2013.01); *H04W 4/029* (2018.02)

(58) Field of Classification Search
CPC .......... G01S 1/68; G01S 5/0284; G01S 11/06; G07C 5/0808; H04B 17/318; H04W 4/023; H04W 4/029; H04W 4/021
USPC ......................................................... 342/385
See application file for complete search history.

(56) References Cited

U.S. PATENT DOCUMENTS

| | | |
|---|---|---|
| 6,816,730 B2 | 11/2004 | Davies et al. |
| 8,248,963 B2 | 8/2012 | Kim et al. |
| 8,655,588 B2 | 2/2014 | Wong et al. |
| 9,580,285 B2 | 2/2017 | Wong et al. |
| 9,838,849 B2 | 12/2017 | Kusens et al. |
| 9,877,164 B2 | 1/2018 | Giordano et al. |
| 9,949,226 B1 | 4/2018 | Sun et al. |

(Continued)

FOREIGN PATENT DOCUMENTS

| | | |
|---|---|---|
| CN | 104135749 A | 11/2014 |
| CN | 107462868 A | 12/2017 |

(Continued)

*Primary Examiner* — Amancio Gonzalez
(74) *Attorney, Agent, or Firm* — Armstrong Teasdale LLP

(57) ABSTRACT

A system for use in transmitting data. The system includes at least one wireless beacon positionable in a work zone, with the at least one wireless beacon configured to emit a signal. A diagnostic device is configured to mate with an object positionable in the work zone, the diagnostic device including a wireless transceiver configured to receive the signal, and a controller in communication with the wireless transceiver. The controller is configured to receive a data package associated with the object, determine a location of the object based on an analysis of the signal, and transmit, via the wireless transceiver, the data package to the work zone when it is determined that the object is positioned within the work zone.

20 Claims, 3 Drawing Sheets

(56) References Cited

U.S. PATENT DOCUMENTS

| | | | |
|---|---|---|---|
| 9,998,857 B2 | 6/2018 | Kusens et al. | |
| 10,346,807 B2* | 7/2019 | Tvaroh | G06F 3/0484 |
| 10,430,754 B2* | 10/2019 | Amann | H04W 4/33 |
| 11,195,153 B2* | 12/2021 | Swift | H04W 4/02 |
| 11,343,758 B2* | 5/2022 | Tod | H04W 24/10 |
| 2017/0339528 A1 | 11/2017 | Gronqvist et al. | |
| 2018/0077532 A1 | 3/2018 | Wulff | |
| 2018/0253104 A1 | 9/2018 | Miyamoto et al. | |
| 2018/0292216 A1 | 10/2018 | Jimenez et al. | |
| 2019/0020978 A1 | 1/2019 | Finschi et al. | |

FOREIGN PATENT DOCUMENTS

| | | |
|---|---|---|
| CN | 108287330 A | 7/2018 |
| DE | 102016109936 A1 | 11/2017 |
| EP | 3232221 A1 | 10/2017 |

* cited by examiner

SYSTEMS AND METHODS FOR USE IN TRANSMITTING DATA

BACKGROUND

The present disclosure relates generally to mass production facilities and processes and, more specifically, to systems and methods of selectively transmitting data within a mass production facility based on proximity.

In some known manufacturing processes, it is important to know when a product has entered a defined work zone along a production line. In vehicle production, for example, the production line generally includes multiple work zones in which work is performed on a vehicle with equipment. To enable the facility to output mass production volume, many manufacturing processes include repetitive use of the work zones that each contain identical production equipment. In such facilities, some known processes include parking a vehicle in one of the duplicate-use work zones and pairing a diagnostic tool with production equipment in the work zone. To initiate operation of the paired production equipment, a production associate then manually selects, on the diagnostic tool, the work zone associated with the vehicle's location. However, manual selection on the diagnostic tool is a laborious task that may be prone to human error, and selection of an incorrect work zone may result in process rechecks and/or production delays.

In addition, some known vehicles have identical body styles, but some may be equipped with different build features. As such, certain production equipment in the work zones may operate on one vehicle, but not another. In at least some known facilities, the production associate uses a handheld barcode scanner to scan a document associated with the vehicle. Identification and build feature data obtained from the scan is then transmitted to the production equipment to facilitate operation thereof. However, manually scanning each vehicle at each work zone is also a laborious and time-consuming task that consumes valuable production time.

BRIEF DESCRIPTION

In one aspect, a system for use in transmitting data is provided. The system includes at least one wireless beacon positionable in a work zone, with the at least one wireless beacon configured to emit a signal. A diagnostic device is configured to mate with an object positionable in the work zone, the diagnostic device including a wireless transceiver configured to receive the signal, and a controller in communication with the wireless transceiver. The controller is configured to receive a data package associated with the object, determine a location of the object based on an analysis of the signal, and transmit, via the wireless transceiver, the data package to the work zone when it is determined that the object is positioned within the work zone.

In another aspect, a manufacturing facility is provided. The facility includes a first work zone and a second work zone, at least one first wireless beacon positioned in the first work zone, and at least one second wireless beacon positioned in the second work zone. The at least one first wireless beacon is configured to emit a first signal, and the at least one second wireless beacon is configured to emit a second signal different from the first signal. A diagnostic device is configured to mate with an object positionable in the first work zone or the second work zone. The diagnostic device includes a wireless transceiver configured to receive the first signal and the second signal, and a controller in communication with the wireless transceiver. The controller is configured to receive a data package associated with the object, determine a location of the object relative to the first work zone or the second work zone based on an analysis of the first signal and the second signal, and transmit, via the wireless transceiver, the data package to one of the first work zone or the second work zone in which the object is determined to be located.

In yet another aspect, a method for use in transmitting data is provided. The method includes scanning for a plurality of signals including a plurality of first signals emitted from a first wireless beacon cluster, and a plurality of second signals emitted from a second wireless beacon cluster. The scan is performed at one of a first work zone associated with the first wireless beacon cluster or a second work zone associated with the second wireless beacon cluster. The method further includes receiving a data package associated with an object positionable within the first work zone or the second work zone, determining a location of the object relative to the first work zone or the second work zone based on an analysis of the plurality of first signals and the plurality of second signals, and transmitting the data package to one of the first work zone or the second work zone in which the object is determined to be located.

DETAILED DESCRIPTION

Figure 1:
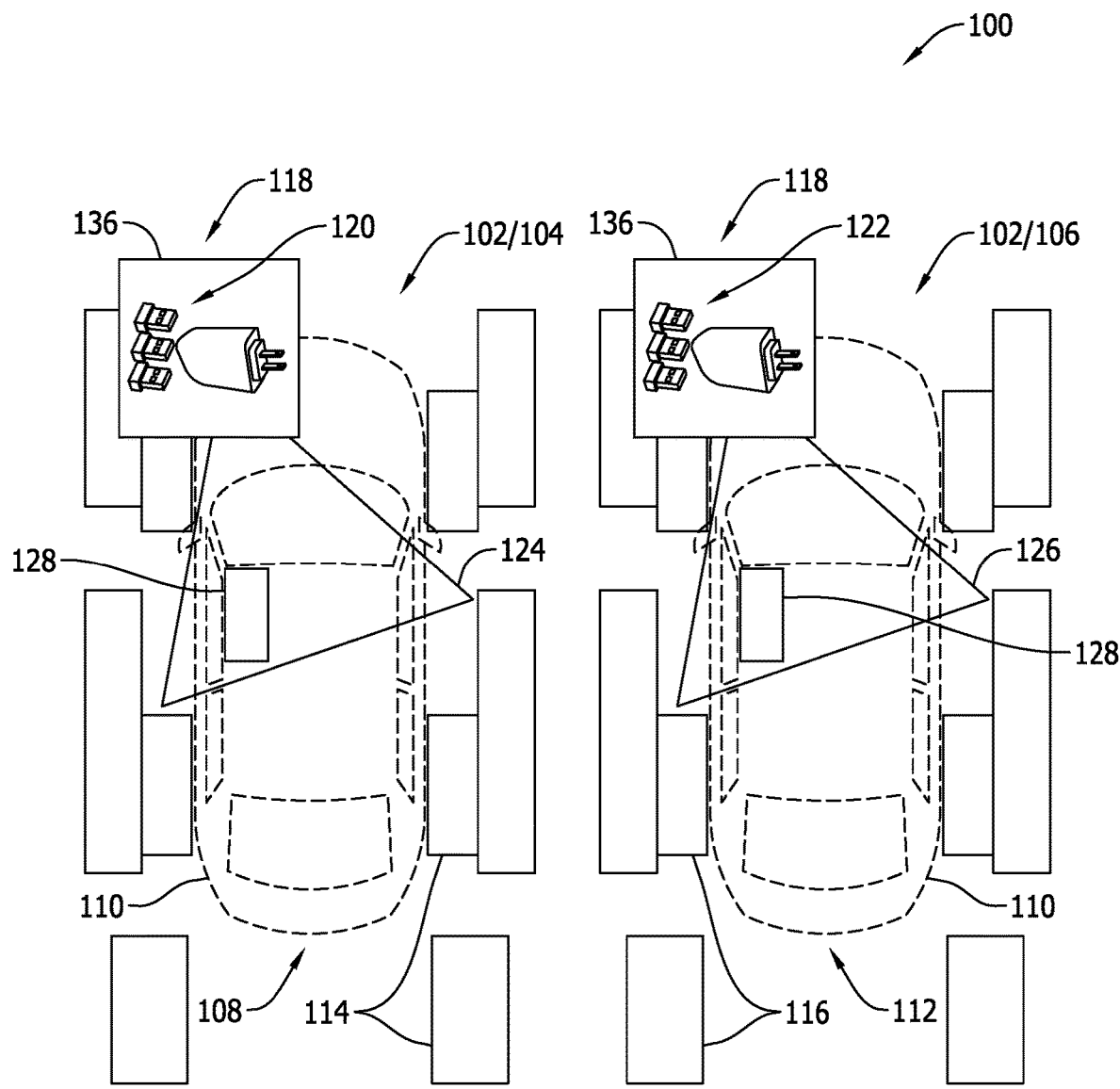
FIG. 1 is a plan schematic view of an exemplary manufacturing facility.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

The embodiments described herein relate generally to systems and methods of selectively transmitting data within a mass production facility based on proximity. In the exemplary embodiment, the system includes at least one wireless beacon positionable in a work zone, and a diagnostic device configured to mate with an object, such as a vehicle, that is positionable in the work zone. In operation, the wireless beacon emits a signal, and the diagnostic device receives and analyzes the signal to determine a location of the object. The diagnostic device also receives a data package from the object when mated therewith, and transmits the data package to the work zone that the object is determined to be completely positioned within the work zone. In a production or manufacturing setting, a facility includes multiple work zones that each include at least one wireless beacon positioned therein. The beacons each emit unique signals, and the diagnostic device analyzes the characteristics of the signals to determine the proximity of the diagnostic device, and of the associated object, relative to the work zones. In such an embodiment, the data package is only transmitted to the work zone in which the object is determined to be located. As such, the systems and methods described herein facilitate reducing and/or eliminating human intervention and/or human error in a manufacturing process, and facilitate providing accurate location detection capabilities, thereby enabling an increased production output in the facility.

FIG. 1 is a plan schematic view of an exemplary manufacturing facility 100. In the exemplary embodiment, manufacturing facility 100 includes a plurality of work zones 102 including, but not limited to, a first work zone 104 and a second work zone 106. First work zone 104 includes a first parking location 108 for a vehicle 110 (i.e., an object), and second work zone 106 includes a second parking location 112 for vehicle 110. In addition, first work zone 104 contains first equipment 114, and second work zone 106 contains second equipment 116. First equipment 114 and second equipment 116 are selectively operable for working on vehicle 110 when positioned within one of work zones 104 and 106. Exemplary equipment includes, but is not limited to, mechanical tools, diagnostic tools, and the like.

Manufacturing facility 100 also includes a system 118 for use in selectively transmitting data to first and/or second work zones 104 and 106. In the exemplary embodiment, system 118 includes at least one first wireless beacon 120 positioned in first work zone 104, and at least one second wireless beacon 122 positioned in second work zone 106. Alternatively, any number of first wireless beacons 120 and/or second wireless beacons 122 may be positioned within the respective first and second work zones 104 and 106. For example, a plurality of first wireless beacons 120 (i.e., a first wireless beacon cluster) and a plurality of second wireless beacons 122 (i.e., a second wireless beacon cluster) may be positioned within the respective first and second work zones 104 and 106. An exemplary wireless beacon includes, but is not limited to, a Bluetooth® emitter. First wireless beacons 120 each emit a first signal 124, and second wireless beacons 122 each emit a second signal 126 that is unique and different from each first signal 124. As such, as will be described in more detail below, emitting a plurality of distinct first signals 124 and second signals 126 from system 118 facilitates enhancing the confidence that results of a location determination algorithm are accurate.

Figure 2:
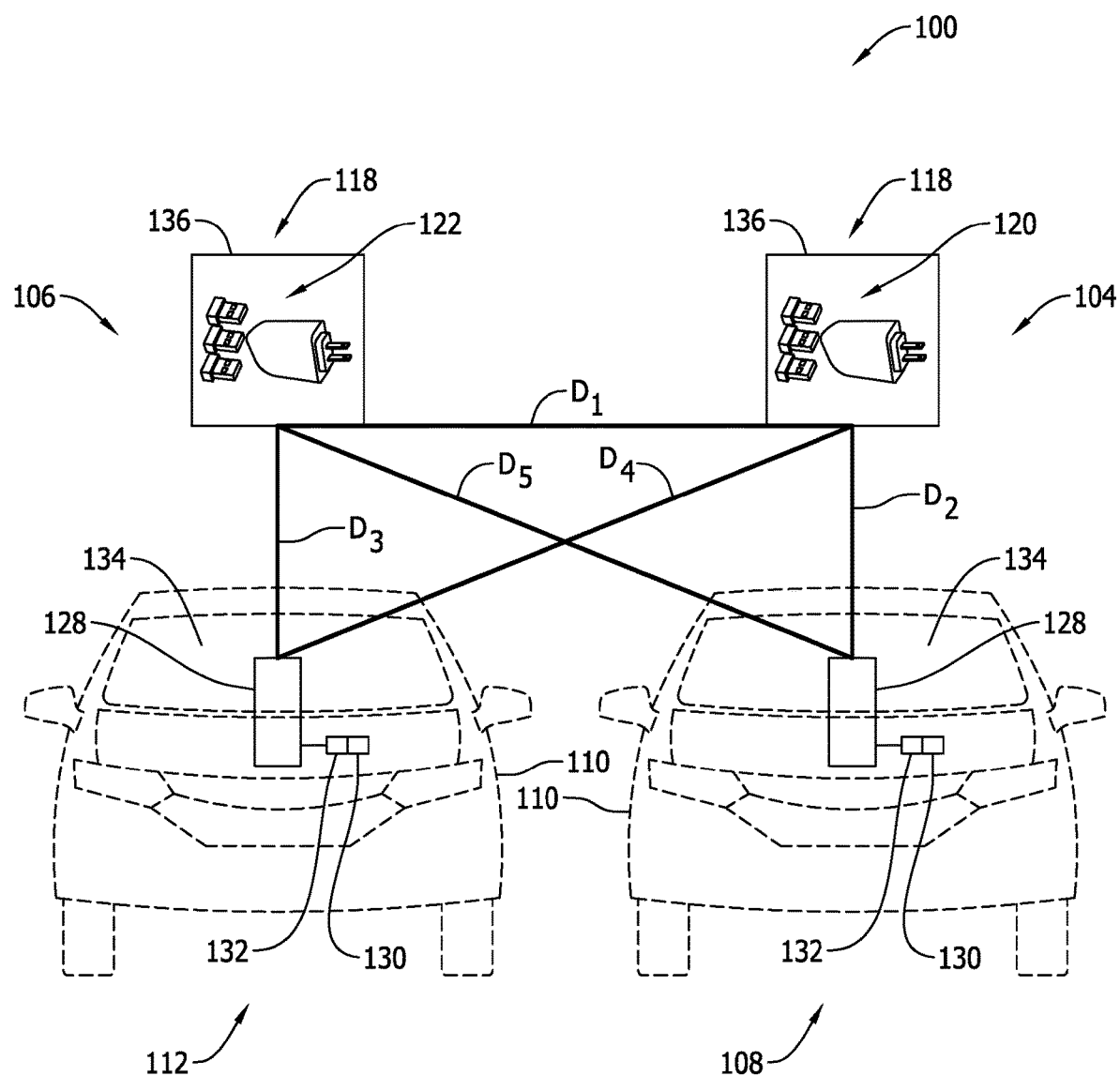
FIG. 2 is an elevational side view of the manufacturing facility shown in FIG. 1.

FIG. 2 is an elevational side view of manufacturing facility 100. In the exemplary embodiment, system 118 also includes a diagnostic device 128 that is compatible for mating with vehicle 110. For example, vehicle 110 includes an onboard diagnostics (OBD) port 130, and diagnostic device 128 includes a plug 132 adapted to interface with OBD port 130. In one embodiment, diagnostic device 128 is positionable within vehicle 110 when interfacing therewith. As such, vehicle 110 and diagnostic device 128 are positioned at approximately the same location within manufacturing facility 100, which better enables the location of diagnostic device 128 to be correlated to the location of vehicle 110.

As will be described in more detail below, diagnostic device 128 is operable to determine a location of vehicle 110 relative to first and second work zones 104 and 106 and based on its proximity to first wireless beacons 120 and second wireless beacons 122. In the exemplary embodiment, first wireless beacons 120 and second wireless beacons 122 are spaced a distance apart from each other, and relative to respective work zones 104 and 106, that facilitates enhancing the accuracy of the results of a location determination algorithm. For example, first wireless beacons 120 and second wireless beacons 122, and by proxy first work zone 104 and second work zone 106, are spaced a distance $D_1$ from each other, first wireless beacons 120 are spaced a distance $D_2$ from diagnostic device 128 within vehicle 110 that is parked at first parking location 108, and second wireless beacons 122 are spaced a distance $D_3$ from diagnostic device 128 that is within vehicle 110 parked at second parking location 112. Distance $D_1$ is larger than distances $D_2$ and $D_3$. As such, a distance $D_4$ between first wireless beacons 120 and diagnostic device 128 at second parking location 112 is larger than distance $D_2$, and a distance $D_5$ defined between second wireless beacons 122 and diagnostic device 128 at first parking location 108 is larger than distance $D_3$.

First wireless beacons 120 and second wireless beacons 122 may be positioned anywhere within the respective first and second work zones 104 and 106 that complies with the proximity guidelines outlined above, and that enables system 118 to function as described herein. In the exemplary embodiment, first wireless beacons 120 and second wireless beacons 122 are each elevated at a height above the respective first and second parking locations 108 and 112. Vehicle 110 includes a windshield 134, and first and second parking locations 108 and 112 have predefined spatial constraints within first and second work zones 104 and 106. As such, first wireless beacons 120 are positioned relative to first parking location, and second wireless beacons 122 are positioned relative to second parking location 112, at relative locations that enable line of sight to be provide with diagnostic device 128 through windshield 134. Thus, a signal strength of first signals 124 (shown in FIG. 1) received by diagnostic device 128 at first parking location 108, and of second signals 126 (shown in FIG. 2) received by diagnostic device 128 at second parking location 112, is enhanced, thus facilitating enhancing the accuracy of the results of a location determination algorithm.

Figure 3:
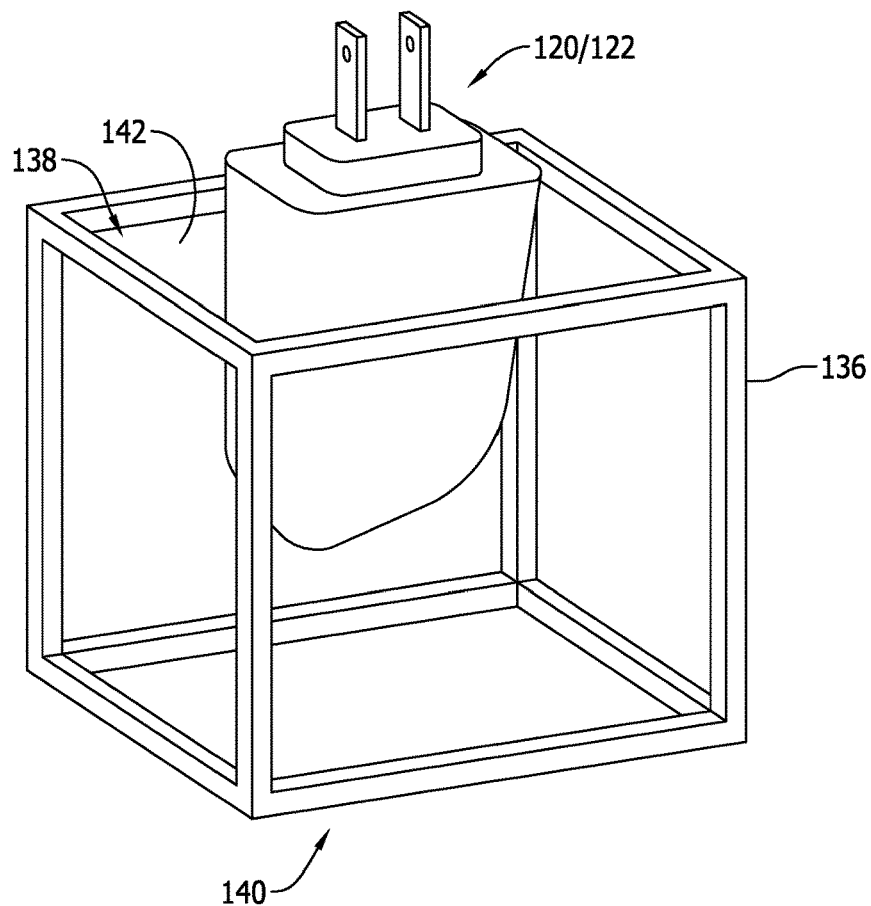
FIG. 3 is a perspective illustration of an exemplary enclosure that may be used in the manufacturing facility shown in FIGS. 1 and 2.

FIG. 3 is a perspective illustration of an exemplary enclosure 136 that may be used in manufacturing facility 100 (shown in FIGS. 1 and 2). In the exemplary embodiment, first wireless beacons 120 and/or second wireless beacons 122 may be housed within enclosure 136. Enclosure 136 includes an interior 138 sized to receive wireless beacons 120 and 122, an opening 140, and a layer 142 of radiation-absorbent material that lines interior 138. In one embodiment, the radiation-absorbent material is a foam material, and layer 142 is arranged in a pyramidal configuration that facilitates reducing signal emissions from layer 142. As such, first and second signals 124 or 126 (shown in FIG. 1) emitted from respective first and second wireless beacons 120 and 122 are focused to emit through opening 140. As shown in FIG. 2, enclosure 136 is oriented such that opening 140 faces towards either respective first parking location 108 or second parking location 112. As such, controlling the broadcast area of first and second wireless beacons 120 and 122 facilitates reducing signal noise in adjacent work zones.

Figure 4:
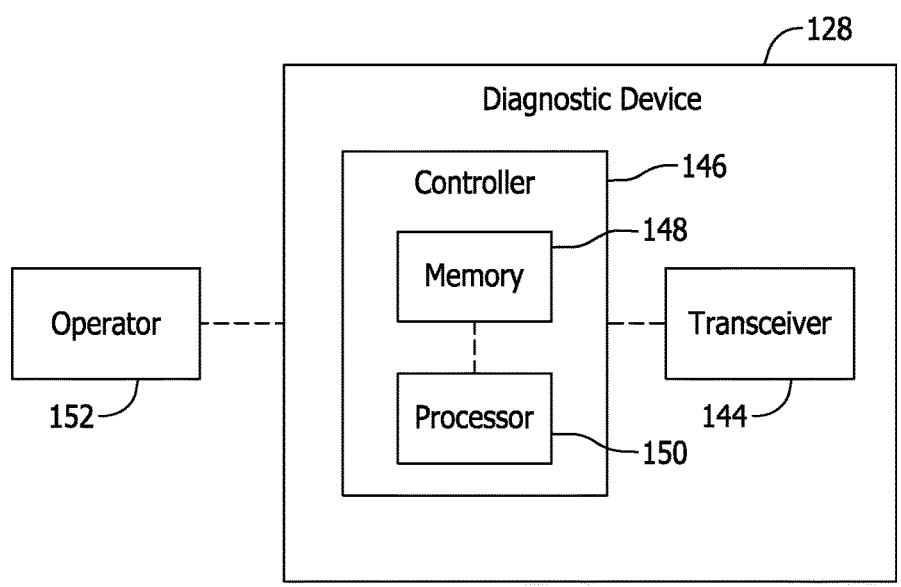
FIG. 4 is a block diagram illustrating an exemplary diagnostic device that may be used in the manufacturing facility shown in FIGS. 1 and 2.

FIG. 4 is a block diagram illustrating an exemplary diagnostic device 128. In the exemplary embodiment, diagnostic device 128 includes a wireless transceiver 144, and a controller 146 in communication with wireless transceiver 144. Controller 146 includes a memory 148 and a processor 150, comprising hardware and software, coupled to the memory for executing programmed instructions. The processor 150 may include one or more processing units (e.g., in a multi-core configuration) and/or include a cryptographic accelerator (not shown). Controller 146 is programmable to perform one or more operations described herein by programming memory 148 and/or processor 150. For example, processor 150 may be programmed by encoding an operation as executable instructions and providing the executable instructions in memory 148.

Processor 150 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 150, cause processor 150 to perform at least a portion of the functions described herein. The above examples are exemplary only, and thus are not intended to limit in any way the definition and/or meaning of the term processor.

Memory 148 is one or more devices that enable information such as executable instructions and/or other data to be stored and retrieved. Memory 148 may include one or more computer-readable media, such as, without limitation, dynamic random access memory (DRAM), synchronous dynamic random access memory (SDRAM), static random access memory (SRAM), a solid state disk, and/or a hard disk. Memory 148 may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by processor 150 to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 146 to permit access and/or execution by processor 150. In an alternative implementation, the computer-readable media is not removable.

Referring again to FIG. 1, operation of system 118 will be described in the context of first work zone 104, but it should be understood that the following description is also applicable to second work zone 106. In operation, a vehicle 110 is parked in first parking location 108 and an operator 152 (shown in FIG. 4) interfaces diagnostic device 128 with vehicle 110. Diagnostic device 128 receives a data package associated with vehicle 110 when interfaced therewith. Data package includes information such as, but not limited to, the vehicle identification number (VIN) and build features of vehicle 110. Exemplary build features include, but are not limited to, optional accessories and functionalities that are installed only on select models of vehicle 110.

Diagnostic device 128 is also operable to scan for signals emitted from first wireless beacons 120 and second wireless beacons 122, for example. The scan may be initiated manually or automatically as a result of a triggering event. For example, a scan may be initiated upon detection of initiation of the interface between diagnostic device 128 and vehicle 110. Enabling the automatic scan facilitates ensuring diagnostic device 128 and vehicle 110 are at the same location.

In the exemplary embodiment, controller 146 (shown in FIG. 4) of diagnostic device 128 determines a location of vehicle 110 relative to first and second work zones 104 and 106 based on an analysis of signals received during the scan. The analysis is based on at least at least one of the following criteria: 1) a received signal strength indicator (RSSI) value of first signals 124 and second signals 126, 2) a comparison of each RSSI value to a threshold signal strength level, and 3) a count of first signals 124 and second signals 126 having an RSSI value equal to or greater than the threshold signal strength level. The location of vehicle 110 may be determined based on an analysis of only one of the criteria listed above. However, determining the location of vehicle 110 based on an analysis of two or more of the criteria facilitates enhancing the accuracy of the determination.

In one embodiment, controller 146 uses an algorithm to determine the location of vehicle 110. For example, with reference to the criteria above, the algorithm includes comparing each RSSI value for the signals received by diagnostic device 128 to a threshold signal strength value. Signals having an RSSI value less than the threshold signal strength value are omitted from further analysis in the algorithm, and the remaining signals are then analyzed. For example, the algorithm also includes analyzing a count of the number of signals received at diagnostic device 128. The determined number of signals received is cross-referenced against the number of active beacons in system 118. If the number of signals received from a particular work zone is less than the number of active beacons in the particular work zone, it can be determined that the vehicle 110 is not located in the work zone. The algorithm also determines the location of vehicle 110 based on which of the received signals has a greater RSSI value. In general, the signal strength of emitted signals is progressively reduced as a distance between the source of the signals and the receiver of the signals is increased. As such, the algorithm correlates the location of vehicle 110 to the work zone in which signals associated therewith are determined to have the greatest signal strength, as received at diagnostic device 128.

After the location of vehicle 110 is determined, controller 146 causes transceiver 144 (shown in FIG. 4) to transmit the data package to the work zone in which vehicle 110 is located. More specifically, controller 146 causes transceiver 144 to transmit the data package to production equipment, such as first equipment 114 and second equipment 116, assigned to the work zone in which vehicle 110 is located. In some embodiments, operation of the production equipment is adapted based on information contained in the data package. For example, manufacture of one object may require the use of some equipment, while the manufacture of another object, having a distinct configuration from the one object, does not. In addition, the objects to be manufactured may have different optional features (e.g., different types of roof configurations such as a sunroof, a panoramic roof, or a standard solid roof) that each require different types of equipment to be utilized to facilitate installation.

In some embodiments, the signals received at diagnostic device 128 have a unique identifier associated with the work zone from which the signals are emitted. In operation, the signals may be analyzed in accordance with the algorithm and the unique identifier of the signals associated with the vehicle location displayed on diagnostic device 128. As such, operator 152 has the capability to independently verify that the algorithm accurately determined the location of vehicle 110.

The embodiments described herein relate to systems and methods of selectively transmitting data that facilitate reducing human intervention and/or human error in a manufacturing process, and that facilitate providing accurate location detection capabilities, thereby enabling an increased production output in a manufacturing facility. The systems and methods described herein accomplish the aforementioned objectives by analyzing aspects of signals received at the vehicle parked in a work zone. The analysis enables the system to determine and/or confirm the location of the vehicle relative to the work zone in an at least partially automated manner.

Exemplary embodiments of a data transmission system are described above in detail. Although the systems herein described and illustrated in association with a manufacturing facility, the invention is also intended for use in any facility having a need to track objects processed therethrough. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in transmitting data, the system comprising:
   at least one wireless beacon positionable in a work zone, the at least one wireless beacon configured to emit a signal; and
   a diagnostic device configured to mate with an object positionable in the work zone, the diagnostic device comprising:
      a wireless transceiver configured to receive the signal; and
      a controller in communication with the wireless transceiver, the controller configured to:
         receive a data package associated with the object;
         determine a location of the object based on an analysis of the signal; and
         transmit, via the wireless transceiver, the data package to the work zone when it is determined that the object is positioned within the work zone.

2. The system in accordance with claim 1, wherein the at least one wireless beacon comprises a plurality of wireless beacons each configured to emit the signal, thereby defining a plurality of signals.

3. The system in accordance with claim 2, wherein the controller is configured to determine the location of the object based on a received signal strength indicator (RSSI) value of the plurality of signals, a comparison each RSSI value to a threshold signal strength level, and a count of the plurality of signals having an RSSI value equal to or greater than the threshold signal strength level.

4. The system in accordance with claim 1 further comprising an enclosure that comprises an interior sized to receive the at least one wireless beacon, an opening, and a layer of radiation-absorbent material lining the interior such that the signal emitted from the at least one wireless beacon is focused for emission through the opening.

5. The system in accordance with claim 1, wherein the diagnostic device is configured to mate with the object via an on-board diagnostics port in the object.

6. The system in accordance with claim 1, wherein the controller is configured to cause the wireless transceiver to transmit the data package to equipment in the work zone, wherein operation of the equipment is adapted based on information contained in the data package.

7. A manufacturing facility comprising:
   a first work zone and a second work zone;
   at least one first wireless beacon positioned in the first work zone, the at least one first wireless beacon configured to emit a first signal;
   at least one second wireless beacon positioned in the second work zone, the at least one second wireless beacon configured to emit a second signal different from the first signal; and
   a diagnostic device configured to mate with an object positionable in the first work zone or the second work zone, the diagnostic device comprising:
      a wireless transceiver configured to receive the first signal and the second signal; and
      a controller in communication with the wireless transceiver, the controller configured to:
         receive a data package associated with the object;
         determine a location of the object relative to the first work zone or the second work zone based on an analysis of the first signal and the second signal; and
         transmit, via the wireless transceiver, the data package to one of the first work zone or the second work zone in which the object is determined to be located.

8. The manufacturing facility in accordance with claim 7, wherein the first work zone comprises a first parking location for the object, and the second work zone comprises a second parking location for the object, wherein a distance between the at least one first wireless beacon and the second parking location is greater than a distance between the at least one first wireless beacon and the first parking location, and wherein a distance between the at least one second wireless beacon and the first parking location is greater than a distance between the at least one second wireless beacon and the second parking location.

9. The manufacturing facility in accordance with claim 8 further comprising:
   a first enclosure that comprises an interior sized to receive the at least one first wireless beacon, an opening, and a layer of radiation-absorbent material lining the interior, wherein the opening is oriented to focus the first signal emitted from the at least one first wireless beacon towards the first parking location; and a second enclosure that comprises an interior sized to receive the at least one second wireless beacon, an opening, and a layer of radiation-absorbent material lining the interior, wherein the opening is oriented to focus the second signal emitted from the at least one second wireless beacon towards the second parking location.

10. The manufacturing facility in accordance with claim 8, wherein the diagnostic device is configured to mate with the object, and is configured to scan for the first signal and the second signal, when the object is positioned at the first parking location or the second parking location.

11. The manufacturing facility in accordance with claim 10, wherein the object is a vehicle including a windshield, the at least one first wireless beacon being positioned relative to the first parking location, and the at least one second wireless beacon being positioned relative to the second parking location, to provide line of sight with the diagnostic device through the windshield.

12. The manufacturing facility in accordance with claim 7, wherein the at least one first wireless beacon comprises a plurality of first wireless beacons each configured to emit the first signal, thereby defining a plurality of first signals, and wherein the at least one second wireless beacon comprises a plurality of second wireless beacons each configured to emit the second signal, thereby defining a plurality of second signals.

13. The manufacturing facility in accordance with claim 12, wherein the controller is configured to determine the location of the object based on a received signal strength indicator (RSSI) value of the plurality of first signals and the plurality of second signals, a comparison of each RSSI value to a threshold signal strength level, and a count of first signals and second signals having an RSSI value equal to or greater than the threshold signal strength level.

14. The manufacturing facility in accordance with claim 7 further comprising first equipment in the first work zone, and second equipment in the second work zone, the first equipment and the second equipment configured to work on the object.

15. The manufacturing facility in accordance with claim 14, wherein one of the first equipment or the second equipment is configured to receive the data package, and wherein operation of the first equipment and the second equipment is adapted based on information contained in the data package.

16. A method for use in transmitting data, the method comprising:

scanning for a plurality of signals including a plurality of first signals emitted from a first wireless beacon cluster, and a plurality of second signals emitted from a second wireless beacon cluster, wherein the scan is performed at one of a first work zone associated with the first wireless beacon cluster or a second work zone associated with the second wireless beacon cluster;

receiving a data package associated with an object positionable within the first work zone or the second work zone;

determining a location of the object relative to the first work zone or the second work zone based on an analysis of the plurality of first signals and the plurality of second signals; and transmitting the data package to one of the first work zone or the second work zone in which the object is determined to be located.

17. The method in accordance with claim 16, wherein determining a location of the object comprises performing the analysis based on at least one of:

a determination of received signal strength indicator (RSSI) values for the plurality of signals;

a comparison of the RSSI values to a threshold signal strength level; or a count of the plurality of signals having an RSSI value equal to or greater than the threshold signal strength level.

18. The method in accordance with claim 17, wherein determining a location comprises determining that the object is located within the first work zone when:

each first signal has an RSSI value greater RSSI values of a remainder of the plurality of signals;

each first signal has an RSSI value greater than the threshold signal strength level; and a number of first signals counted is equal to a number of wireless beacons included in the first wireless beacon cluster.

19. The method in accordance with claim 16, wherein transmitting the data package comprises transmitting the data package to one of first equipment in the first work zone or second equipment in the second work zone, wherein operation of the first equipment and the second equipment is adapted based on information contained in the data package.

20. The method in accordance with claim 19 further comprising receiving the plurality of first signals having a unique identifier, and receiving the plurality of second signals having a unique identifier different from the unique identifier of the first signals.

\* \* \* \* \*